United States Patent [19]

Orlosky

[11] Patent Number: 5,050,718
[45] Date of Patent: Sep. 24, 1991

[54] CONVEYOR TRANSFERRING DEVICE

[75] Inventor: Donald P. Orlosky, Timberlake, Ohio

[73] Assignee: Axia Incorporated, Oak Brook, Ill.

[21] Appl. No.: 483,324

[22] Filed: Feb. 20, 1990

Related U.S. Application Data

[63] Continuation of Ser. No. 291,205, Dec. 28, 1988, abandoned.

[51] Int. Cl.[5] .............................................. B65G 13/00
[52] U.S. Cl. ...................................... 193/35 R; 193/37
[58] Field of Search .............. 193/37, 35 R; 29/121.1, 29/121.2, 121.5, 121.6

[56] References Cited

U.S. PATENT DOCUMENTS

| 2,613,788 | 10/1952 | McLaughlin . | |
|---|---|---|---|
| 2,651,398 | 9/1953 | McGraw | 29/121.6 X |
| 3,545,582 | 12/1970 | Kimmen | 29/121.6 X |
| 3,621,960 | 11/1971 | Kornylak | 193/37 X |
| 3,840,102 | 10/1974 | Dawson . | |
| 3,899,063 | 8/1975 | Pollard . | |
| 3,969,802 | 7/1976 | Bouvet | 29/121.6 |
| 4,541,518 | 9/1985 | Palazzolo et al. . | |
| 4,640,404 | 2/1987 | Bigott . | |

FOREIGN PATENT DOCUMENTS

| 2159888 | 7/1972 | Fed. Rep. of Germany | 193/37 |
|---|---|---|---|
| 1210327 | 9/1959 | France | 193/37 |
| 1601493 | 10/1970 | France | 193/37 |
| 2585680 | 2/1987 | France | 193/37 |
| 226410 | 4/1969 | Sweden | 193/37 |
| 1389590 | 4/1975 | United Kingdom | 193/37 |

Primary Examiner—D. Glenn Dayoan
Attorney, Agent, or Firm—Kirkland & Ellis

[57] ABSTRACT

There is provided a conveyor wheel comprising a male hub, a female hub mateably engaging the male hub, an outer wheel hub having an outer circumference for supporting an object, and a plurality of ball bearings supporting the outer wheel hub with respect to the mateably engaged male and female hubs. The outer wheel hub includes at least one rib of substantially triangular cross-section in the outer circumference. A wheel or roller conveyor including a plurality of the conveyor wheels is also disclosed.

18 Claims, 6 Drawing Sheets

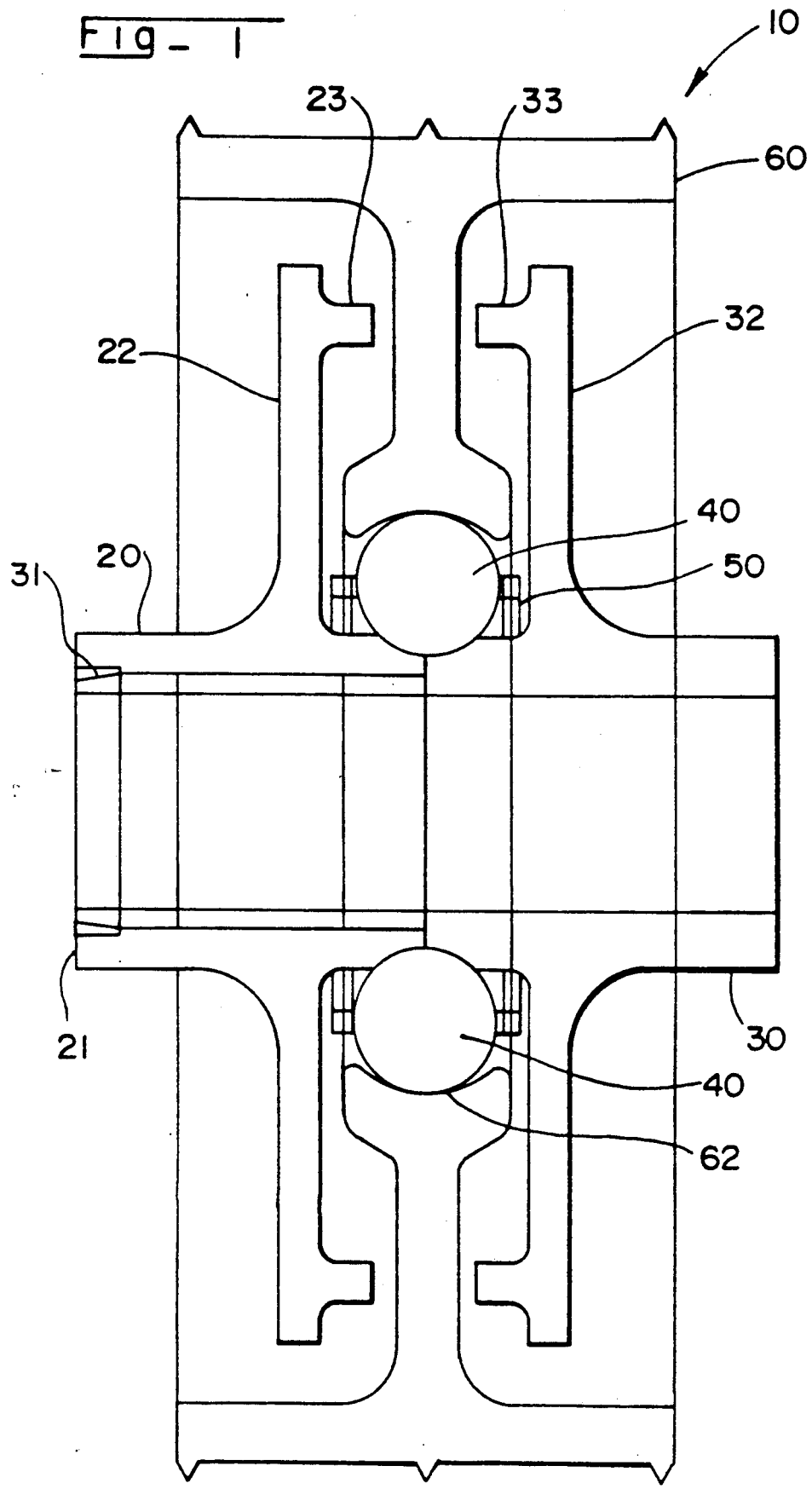

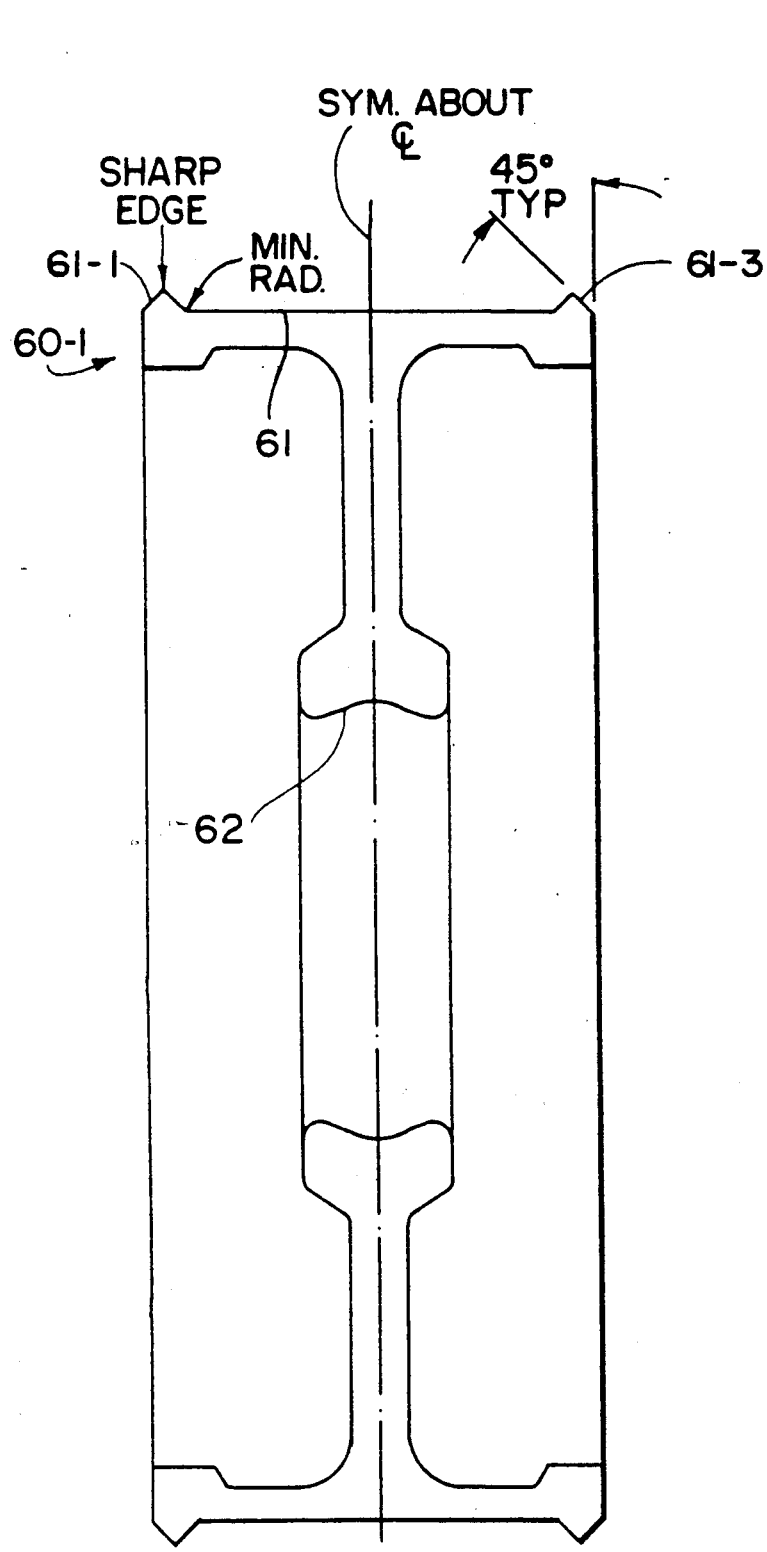
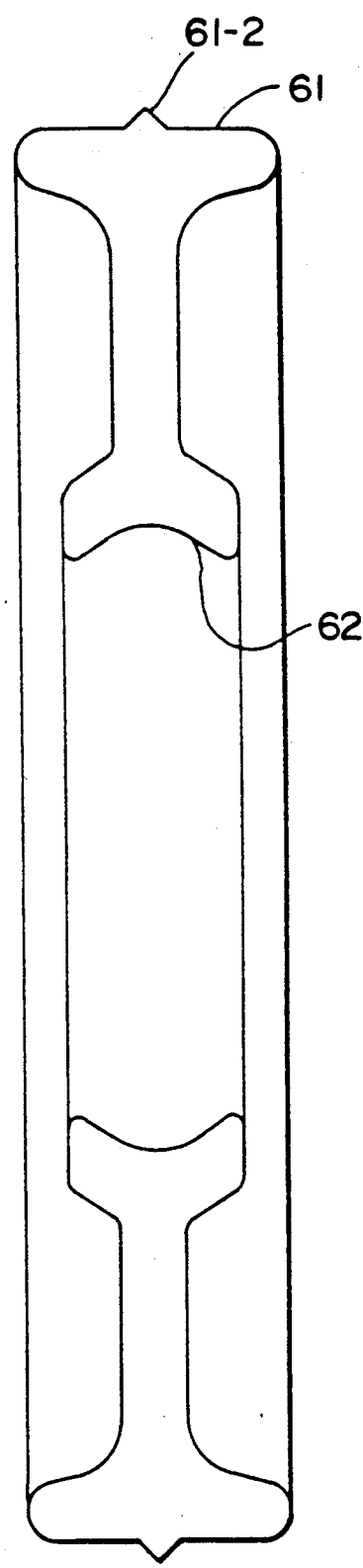
Fig-3
Fig-4

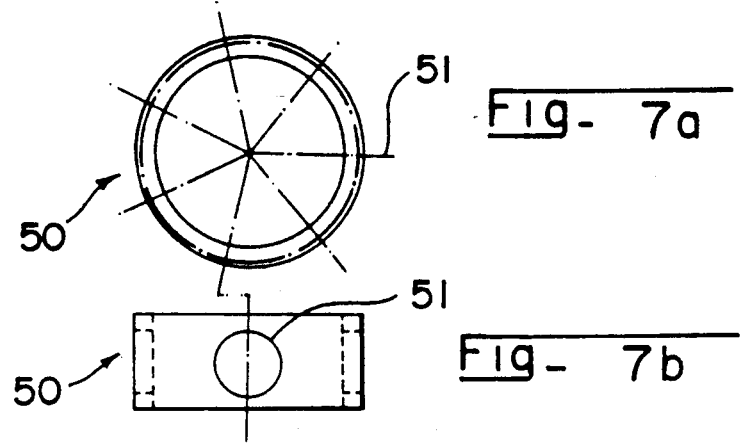
Fig- 7a
Fig- 7b
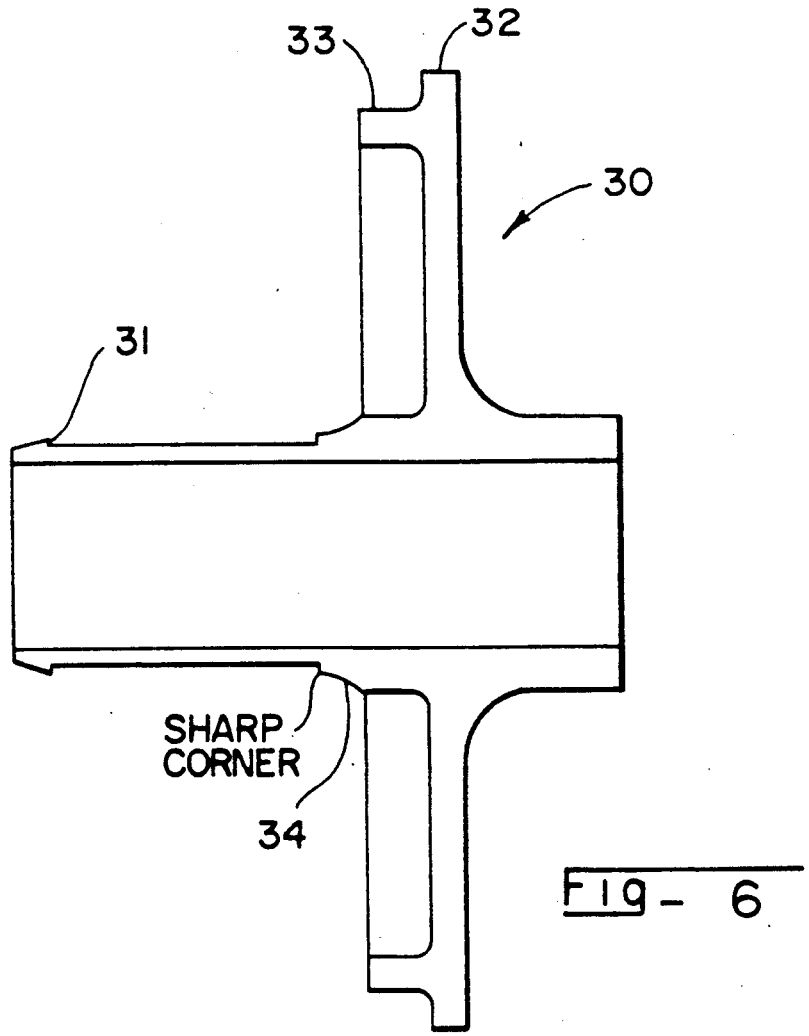
SHARP CORNER
Fig- 6

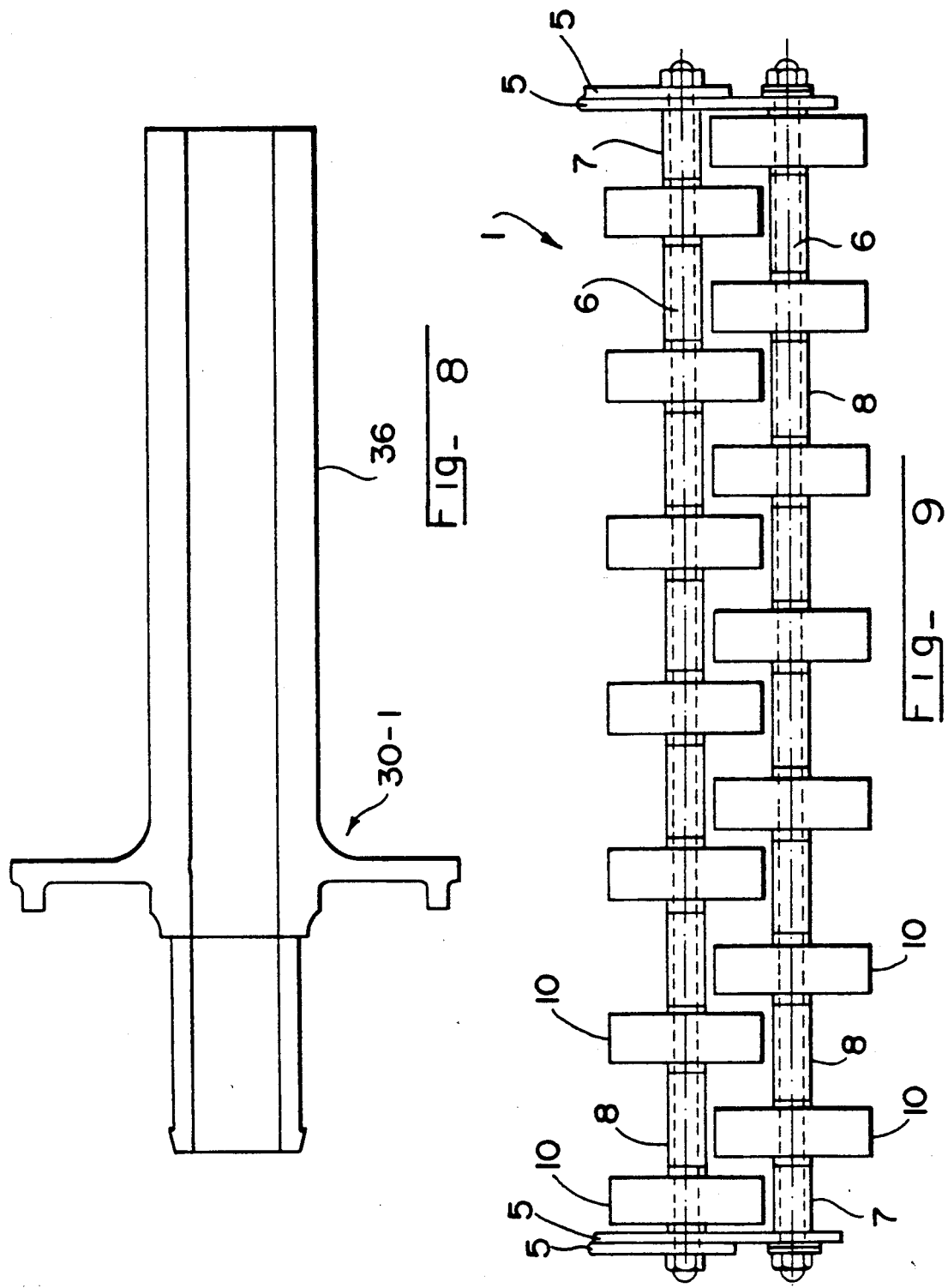

CONVEYOR TRANSFERRING DEVICE

This is a continuation of co-pending application Ser. No. 07/291,205 filed on Dec. 28, 1988, now abandoned.

The present invention relates to material handling equipment and more particularly to the rollers or wheels in conveyors.

BACKGROUND

Conveyors are employed in various fields to transport objects such as boxes along a path, and they typically are of either of two basic types: the belt conveyor and the roller conveyor. Belt conveyors usually comprise a continuous belt of fabric or other suitable material that extends over rotatable rollers which are driven by a motor. Objects supported by the belt are transported as the belt is moved by the rollers. The other basic type of conveyor includes a plurality of shaft-supported rollers or wheels upon which the objects to be transported rest directly. The rollers or wheels may be driven by a motor for moving the objects, or the conveyor may be suitably inclined so that gravity causes the objects to move along the conveyor.

In general, the roller or wheel conveyor includes two or more side rails or walls forming a frame within which are mounted a plurality of shafts or axles that each support one or more freely rotatable wheels or rollers. The axles generally lie in a common plane so that a flat-surfaced object to be transported by the conveyor is supported by the wheels or rollers as it moves along the conveyor. The details of various such, conveyors are disclosed, for example, in U.S. Pat. Nos. 2,613,788, 3,840,102, 3,899,063, 4,541,518 and 4,640,404.

In many material handling applications, the conveyor does not move the objects in a straight path because, for example, the conveyor must turn to avoid obstructions such as building walls and support columns, objects are selectively diverted from one conveyor onto another, etc. Depending on the speed and nature of the objects moving along the conveyor and the abruptness of their change of direction, it is sometimes difficult to keep the objects atop the conveyor without slowing their progress or making their direction changes more gradual. As a result, the handling operation can require more time or more space or both.

In addressing these limitations of prior conveyors, it is an object of the present invention to provide a conveyor roller or wheel that resists the tendency of transported objects to slide off the conveyor.

SUMMARY

In accordance with the present invention, there is provided a conveyor wheel comprising a male hub, a female hub mateably engaging the male hub, an outer wheel hub having an outer circumference for supporting an object, and a plurality of ball bearings supporting the outer wheel hub with respect to the mateably engaged male and female hubs, wherein the outer wheel hub includes at least one rib of substantially triangular cross-section in the outer circumference.

In another embodiment of the present invention, there is provided a wheel conveyor comprising at least two side rails, a plurality of shafts disposed between the side rails substantially in a common plane, and a plurality of conveyor wheels rotatably disposed on the shafts, there being at least one conveyor wheel located on each shaft, wherein each conveyor wheel comprises a male hub, a female hub mateably engaging the male hub, an outer wheel hub having an outer circumference for supporting an object, and a plurality of ball bearings supporting the outer wheel hub with respect to the mateably engaged male and female hubs, the outer wheel hub including at least one rib of substantially triangular cross-section in the outer circumference.

BRIEF DESCRIPTION OF THE DRAWINGS

The objects and advantages of the present invention will be better understood from a reading of the following detailed description in conjunction with the accompanying drawings in which:

FIG. 1 shows a cross-section of one embodiment of a conveyor wheel in accordance with the present invention:

FIGS. 3 and 4 show cross-sections of outer wheel hubs having two ribs and one rib, respectively, in their outer circumferences;

FIG. 6 is a cross-section of a male hub of the conveyor wheel of FIG. 1:

FIGS. 7a and 7b are cross-section and side views of a ball bearing retainer ring of the conveyor wheel of FIG. 1:

FIG. 8 is a cross-section of an alternative male hub for the conveyor wheel of FIG. 1: and FIG. 9 shows a top view of a portion of a wheel conveyor.

DETAILED DESCRIPTION

Figure 2B:
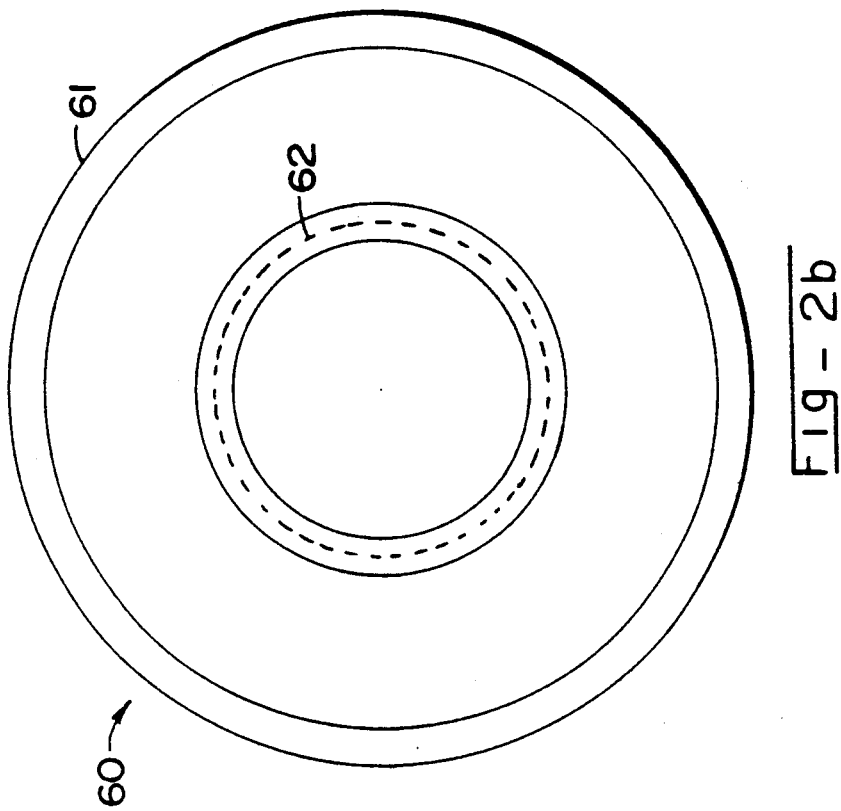
FIGS. 2a, 2b and 2c show cross-section, end and detail views of an outer wheel hub for the conveyor wheel of FIG. 1 having three ribs in its outer circumference.

Referring to the drawings, in which like portions are identified by like reference numerals, FIG. 1 shows a cross-section of a conveyor wheel 10 comprising a female hub 20, a male hub 30, ball bearings 40, a bearing retainer ring 50, and an outer wheel hub 60. The conveyor wheel 10 is typically mounted on a suitable axle or shaft that is disposed through the adjoining bores in the male and female hubs, and the outer wheel hub 60, including inner bearing surface 62, bearings 40 and bearing retainer ring 50 are freely rotatable with respect to the axis of the shaft. It will be understood that, although only two bearings 40 are visible in cross-section in FIG. 1, a larger number of ball bearings is typically required for proper operation of the conveyor wheel 10. For a wheel 1.88 inches in diameter, suitable performance can be obtained with as few as seven 5/32-inch diameter ball bearings, although more may be desirable according to the weight to be transported by the wheel 10.

The wheel 10 is advantageously fabricated by molding parts of a suitable material such as plastic or by stamping material such as metal, so long as the material chosen has good abrasion resistance and a low coefficient of friction. Nylon, DELRIN (a product of E.I. du Pont de Nemours Company), polypropylene and acetal plastics and steel have been found to be suitable materials. Plastic parts are generally more suitable for conveyors intended for transporting lighter, objects while metal parts are often employed for heavier duty applications. Plastic or steel ball bearings are also usable according to the weight of the materials to be transported by the conveyor.

As shown in FIG. 1, the wheel 10 is held together by the cooperation of a circumferential ledge 21 in the bore of the female hub 20 and a circumferential lip 31 in the male hub 30. Upon assembly of the female and male hubs, the inherent resilience of the male hub 30 allows the lip 31 to pass through the bore of the female hub 20 and to spring into engagement with the ledge 21 when fully inserted. Radial flanges 22 and 32 and their circumferential lips 23 and 33 of the female hub 20 and male hub 30, respectively, serve to locate and steady the outer wheel hub 60. In addition, the orientation of the flanges 22, 32 and lips 23, 33 limit contamination of the ball bearings 40 by dust and other detritus in the wheel's environment, and vice versa.

Figure 2C:
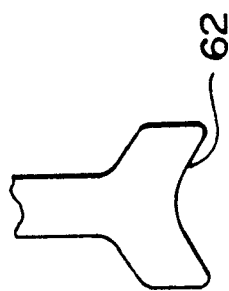
Figure 2A:
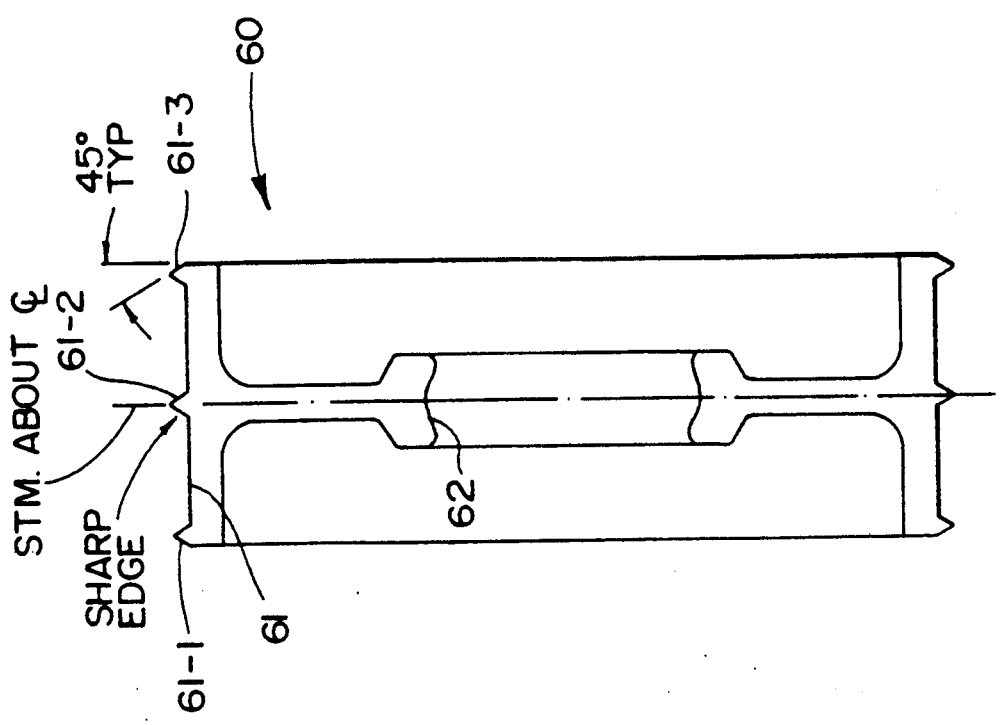

Referring now to FIGS. 2a, 2b and 2c, there is shown an outer wheel hub 60 in accordance with the present invention; the hub 60 has three ribs 61-1, 61-2 and 61-3 disposed in its outer circumference 61. The ribs 61-1, 61-2 and 61-3 are advantageously formed during the molding or stamping of the hub 60, although other methods of formation such as machining by lathe can be used. Each rib 61-1, 61-2 or 61-3 is substantially triangular in cross-section, having a sharp edge disposed for contact with an object (not shown) to be supported by the wheel each rib is thus a ridge of substantially triangular cross-section extending around the entire outer circumference of the hub 60. It will be understood that the phrase "substantially triangular cross-section" is not limited to the equilateral or isosceles shape depicted in FIG. 2a, but includes all other sectional shapes having a sharp edge disposed for contact with an object. The outer wheel hub 60 is supported by ball bearings 40 at inner bearing surface 62, shown in more detail in FIG. 2c.

FIGS. 3 and 4 show, respectively, outer wheel hubs 60-1 and 60-2 having, respectively, two ribs, 61-1, 61-3 and one rib 61-2 disposed in their outer circumferences 61. It will be understood that more than three ribs may be provided, according to the load and material to be supported by the conveyor, and that a rib may be positioned substantially anywhere in the outer circumference of the wheel hub. The structural features of the outer wheel hubs 60-1 and 60-2 are otherwise substantially identical to those of outer wheel hub 60.

When objects are transported by prior conveyors in other than a straight line, the objects tend to slide off the conveyor due to inertia. The more abrupt the change in direction or the faster the transport speed of the objects, the greater is the objects' tendency to slide off the conveyor. Tests have been conducted showing that where the conveyor includes wheels in accordance with the present invention, this tendency of the objects to slide off the conveyor is reduced. In a static test using a thirty-pound object supported by four wheels on each of four axles, the object began sliding across the wheels, i.e., in a direction parallel to the axles, at different angles of inclination of the axles. For wheels having no ribs in their outer circumferences, the object began sliding at an inclination angle of only about twelve degrees, while for wheels having two or three ribs, the object began sliding only at angles in excess of twenty-two degrees. In dynamic tests using various weight objects and a conveyor having selected pitches, i.e., vertical drops per horizontal conveyor length, wheels having ribs showed good performance in maintaining the objects' gravity-induced flow rates compared to unribbed wheels. Therefore, the present invention provides the significant advantages over prior conveyors of higher transport speeds in a more compact and flexible conveyor system.

Figure 5B:
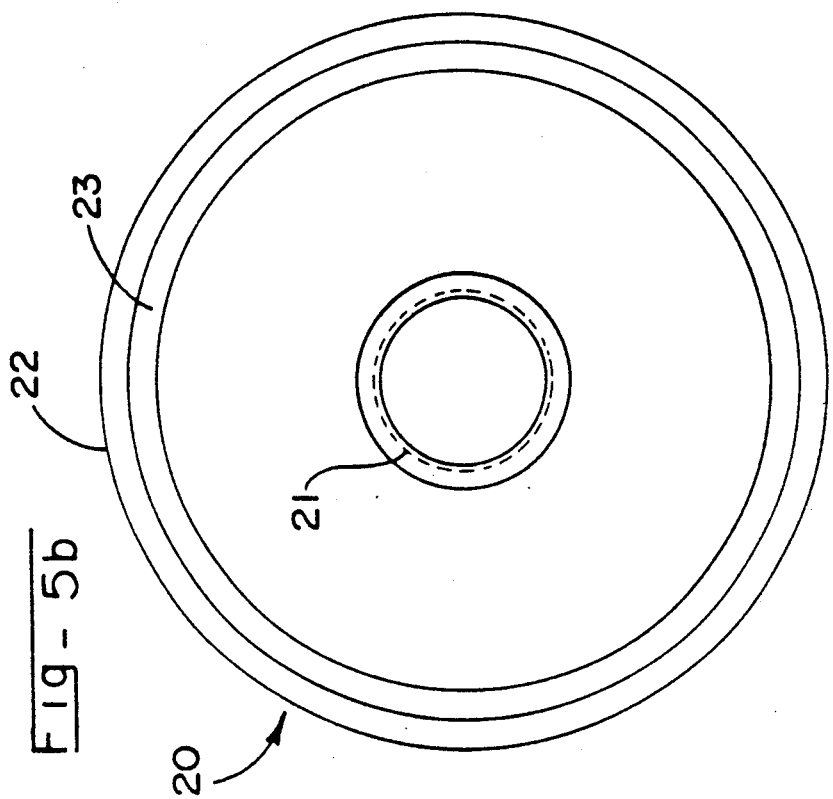
FIGS. 5a, and 5b are cross-section and end views of a female hub of the conveyor wheel of FIG. 1.
Figure 5A:
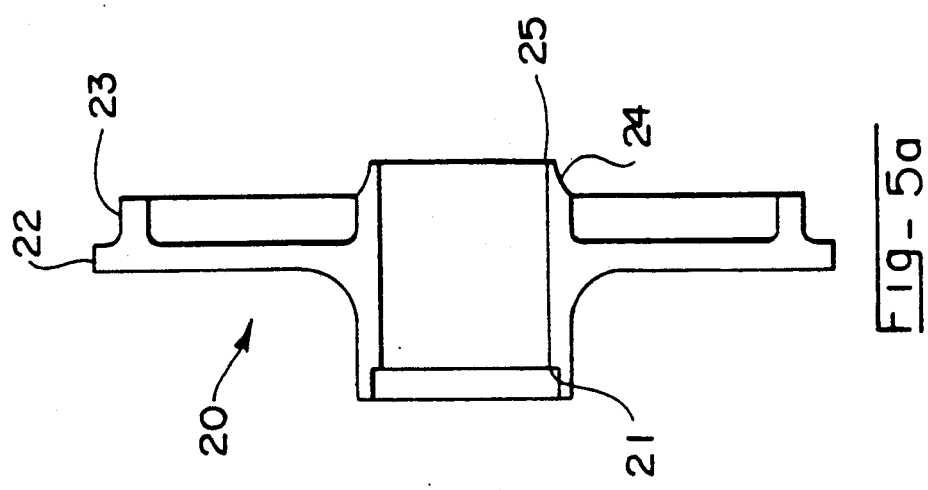

Referring now to FIGS. 5a and 5b, there are shown, respectively, cross-section and end views of a female hub 20 for use in a conveyor wheel in accordance with the present invention. The circumferential ledge 21 is conveniently disposed at one end of the hub's bore and is indicated by the dashed line in FIG. 5b. The flange 22 and flange lip 23 are also shown in the Figures. Curved surface 24 disposed circumferentially at the other end of the hub's bore from the ledge 21 is suitably dimensioned so that surface 24 in cooperation with a curved surfaced 34 on the male hub 30 constitutes a channel for the ball bearings 40. In addition, a slight bevel 25 is advantageously impressed on this end of the hub s bore to facilitate insertion of the male hub 30 into the female hub 20.

FIG. 6 shows a cross-section of a male hub 30 for use in a conveyor wheel in accordance with the present invention. The circumferential lip 31 is disposed at one end of the male hub's bore, engaging the ledge 21 in the female hub 20 upon insertion of the male hub into the female hub and preventing separation of the hubs 20, 30. Flange 32 and flange lip 33 are also shown, as is curved surface 34 which cooperates with curved surface 24 on the female hub 20 to form a channel for ball bearings 40.

Referring now to FIGS. 7a and 7b, there are shown cross-section and side views, respectively, of a bearing retainer ring 50 for use in a conveyor wheel in accordance with the present invention. The ring 50 includes a plurality of holes 51 that are equally spaced around the circumference of the ring 50. The holes 51 are suitably sized to retain the plurality of ball bearings 40 separately against the channel formed by the cooperation of curved surfaces 24 and 34 in the female hub 20 and male hub 30, respectively. At the same time, the ball bearings 40 protrude through the holes 51 thereby contacting the inner bearing surface 62 of the outer wheel hub 60, as shown in FIGS. 1 and 2, and supporting the outer wheel hub with respect to the mateably engaged male and female hubs.

It will be appreciated by those of ordinary skill in this art that the present invention can be embodied in forms other than the conveyor wheel described above. FIG. 8 shows one such alternate embodiment of an extended male hub 30-1. The extended portion 36 of the hub 30-1 facilitates positioning of one or more conveyor wheels 10-1 including the extended hubs 30-1 on a single shaft as in the wheel conveyor shown in FIG. 9. The structural features of the hub 30-1 are otherwise substantially identical to those of male hub 30.

Referring to FIG. 9, there is shown a portion of a wheel conveyor 1 including a support frame formed by side rails 5 and a plurality of transversely disposed shafts 6. Although four side rails 5 are shown in the Figure, it will be understood that only two rails are needed to define a support frame. More than two rails 5 can be provided as shown in the Figure and, for example, in U.S. Pat. No. 3,840,102, so as to form a wider support frame for transporting heavy or wide objects. The shafts 6 are shown mutually parallel, substantially coplanar and suitably located between the side rails 5 so that the outer circumferences of conveyor wheels 10 or 10-1 support objects to be transported by the wheel conveyor 1. It will be understood that the shafts may remain substantially coplanar, although no longer mutually parallel, in curved sections of the conveyor 1.

Suitable end spacers 7 help to locate the conveyor wheels 10 or 10-1 on the shafts 6, and are advantageously formed of a lightweight yet rugged material such as polyethylene tubing. Conveyor wheels 10-1 are generally self-locating because of extended male hubs 36, while wheels 10 are located on the shafts 6 by additional spacer sections 8.

Specific embodiments of the present invention have been described above in detail, however, it will be understood that this description is to be considered in all senses illustrative rather than restrictive. Those skilled in the art will recognize other embodiments and modifications of the present invention, the scope of which is delimited solely by the following claims.

What is claimed is:

1. A conveyor wheel, comprising:
   a male hub having first and second portions, said first portion having an axially outer end and an axially inner end, said axially inner end defining a curved surface, said second portion having a reduced outer diameter with respect to said first portion;
   a female hub having an outer diameter substantially identical to the outer diameter of the first portion of the male hub and mateably engaging the male hub on the second portion of the male hub, the female hub having an axially inner end and an axially outer end, said axially inner end of said female hub defining a curved surface;
   an outer wheel hub having an outer circumference for supporting an object and an inner curved surface; and
   a plurality of ball bearings supporting the outer wheel hub with respect to the male and female hubs, the ball bearings being contained in a channel formed by the inner curved surface of the outer wheel hub, the curved surface at the axially inner end of the first portion of the male hub, and the curved surface at the axially inner end of the female hub;
   wherein the outer wheel hub includes at least one ridge of substantially triangular cross-section extending around the entire outer circumference.

2. The conveyor wheel of claim 1, wherein the outer wheel hub includes two ridges of substantially triangular cross-section extending around the entire outer circumference.

3. The conveyor wheel of claim 1, wherein the outer wheel hub includes three ridges of substantially triangular cross-section extending around the entire outer circumference.

4. The conveyor wheel of claim 1, wherein the first portion of the male hub further comprises a flange extending radially outwards from the male hub, the flange having a lip directed axially inwards, and wherein the female hub further comprises a flange extending radially outwards from the female hub, the flange having a lip directed axially inwards.

5. The conveyor wheel of claim 1, further comprising a ball bearing retainer ring comprising a one hole for each ball bearing, wherein the holes are suitably sized to retain the ball bearings separately in the channel formed by the inner curved surface of the outer wheel hub, the curved surface at the axially inner end of the first portion of the male hub, and the curved surface at the axially inner end of the female hub.

6. A conveyor wheel comprising:
   a male hub;
   a female hub mateably engaging the male hub;
   an outer wheel hub having an outer circumference for supporting an object; and
   a plurality of ball bearings supporting the outer wheel hub with respect to the male and female hubs,
   wherein the outer wheel hub includes at least one ridge of substantially triangular cross-section extending around the entire outer circumference of the outer wheel hub, and the female hub includes a circumferential ledge disposed in a bore through the female hub for mateably engaging a circumferential lip on the male hub.

7. The conveyor wheel of claim 6, wherein the male hub, female hub and outer wheel hub are of steel.

8. The conveyor wheel of claim 6, wherein the male hub includes an extended portion for positioning the conveyor wheel on a shaft.

9. The conveyor wheel of claim 6, wherein the male hub, female hub and outer wheel hub are of plastic.

10. A wheel conveyor, comprising:
    at least two side rails;
    a plurality of shafts transversely disposed between the side rails substantially in a common plane; and
    a plurality of conveyor wheels rotatably disposed on the shafts, there being at least one conveyor wheel located on each shaft, wherein each conveyor wheel comprises a male hub having two portions, the first portion having an axially outer end and an axially inner end, with a curved surface at its axially inner end, the second portion of said male hub having a reduced outer diameter with respect to said first portion, a female hub having an outer diameter substantially identical to the outer diameter of the first portion of the male hub mateably engaging the male hub at the second portion of the male hub, the female hub having an axially inner end and an axially outer end, with a curved surface at its axially inner end, an outer wheel hub having an outer circumference for supporting an object and an inner curved surface, and a plurality of ball bearings supporting the outer wheel hub with respect to the male and female hubs, the ball bearings being contained in a channel formed by the inner curved surface of the outer wheel hub, the curved surface at the axially inner end of the first portion of the male hub, and the curved surface at the axially inner end of the female hub, the outer wheel hub including at least one ridge of substantially triangular cross-section extending around the entire outer circumference.

11. The wheel conveyor of claim 10, wherein the outer wheel hubs each include two ridges of substantially triangular cross-section extending around the entire outer circumference.

12. The wheel conveyor of claim 10, wherein the outer wheel hubs each include three ridges of substantially triangular cross-section extending around the entire outer circumference.

13. The wheel conveyor of claim 10, wherein the first portion of the male hub further comprises a flange extending radially outwards from the male hub, the flange having a lip directed axially inwards, and wherein the female hub further comprises a flange extending radially outwards from the female hub, the flange having a lip directed axially inwards.

14. The wheel conveyor of claim 10, further comprising a ball bearing retainer ring comprising one hole for each ball bearing, wherein the holes re suitably sized to retain the ball bearings separately in the channel formed by the inner curved surface of the outer wheel hub, the curved surface at the axially inner end of the first portion of the male hub, and the curved surface at the axially inner end of the female hub.

15. A wheel conveyor comprising:
at least two side rails;
a plurality of shafts transversely disposed between the side rails substantially in a common plane; and
a plurality of conveyor wheels rotatably disposed on the shafts, there being at least one conveyor wheel located on each shaft, wherein each conveyor wheel comprises a male hub, a female hub mateably engaging the male hub, an outer wheel hub having an outer circumference for supporting an object, and a plurality of ball bearings supporting the outer wheel hub with respect to the male nd female hubs, the outer wheel hub including at least one ridge of substantially triangular cross-section extending around the entire outer circumference, wherein each female hub includes a circumferential ledge disposed in a bore through the female hub for mateably engaging a circumferential lip on its respective male hub.

16. The wheel conveyor of claim 15, wherein the male hubs, female hubs and outer wheel hubs are of steel.

17. The wheel conveyor of claim 15, wherein each male hub includes an extended portion for locating the conveyor wheel on its respective shaft.

18. The wheel conveyor of claim 15, wherein the male hub, female hub and outer wheel hub are of plastic.

* * * * *